United States Patent
Johnson et al.

(10) Patent No.: US 10,007,066 B1
(45) Date of Patent: Jun. 26, 2018

(54) HIGH EFFICIENCY AND POWER FIBER OPTIC ROTARY JOINT

(71) Applicant: BAE SYSTEMS INFORMATION AND ELECTRONIC SYSTEMS INTEGRATION INC., Nashua, NH (US)

(72) Inventors: Benjamin R. Johnson, Nottingham, NH (US); Jeffrey L. Jew, Brookline, NH (US); Michael J. Shaw, Concord, NH (US); Philip R. Staver, Wilton, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days. days.

(21) Appl. No.: 15/489,257

(22) Filed: Apr. 17, 2017

(51) Int. Cl.
*G02B 6/36* (2006.01)
*G02B 6/35* (2006.01)

(52) U.S. Cl.
CPC ......... *G02B 6/3604* (2013.01); *G02B 6/3592* (2013.01)

(58) Field of Classification Search
CPC .................. G02B 6/3604; G02B 6/3592
See application file for complete search history.

(56) References Cited

U.S. PATENT DOCUMENTS

| | | | | |
|---|---|---|---|---|
| 4,398,791 A | * | 8/1983 | Dorsey | G02B 6/3604 385/26 |
| 4,641,915 A | * | 2/1987 | Asakawa | G02B 6/3886 385/26 |
| 4,842,355 A | * | 6/1989 | Gold | G02B 6/28 385/26 |
| 5,588,077 A | | 12/1996 | Woodside | |
| 8,180,187 B2 | * | 5/2012 | Bunch | H01Q 1/1257 385/25 |
| 8,369,662 B2 | | 2/2013 | Popp | |
| 2002/0168139 A1 | * | 11/2002 | Clarkson | G02B 6/262 385/27 |
| 2015/0071588 A1 | | 3/2015 | Zhang et al. | |

FOREIGN PATENT DOCUMENTS

WO 2010/097646 9/2010

* cited by examiner

*Primary Examiner* — Ryan Lepisto
(74) *Attorney, Agent, or Firm* — Sand & Sebolt, LPA

(57) ABSTRACT

A fiber optic rotary joint includes a first fiber optic cable operably coupled to one of a stator and a rotor and a second fiber optic cable operably coupled to the other of the stator and the rotor. The stator and the rotor define a free space optical path between the first fiber optic cable and the second fiber optic cable. The rotor is rotatable about an axis of rotation parallel and collinear with an optical axis of at least one end of the fiber optic rotary joint. A first beam conditioning mechanism is configured to condition a light beam emitted from the first fiber optic cable and a second beam conditioning mechanism is configured to focus the conditioned light beam into the second fiber optic cable.

20 Claims, 14 Drawing Sheets

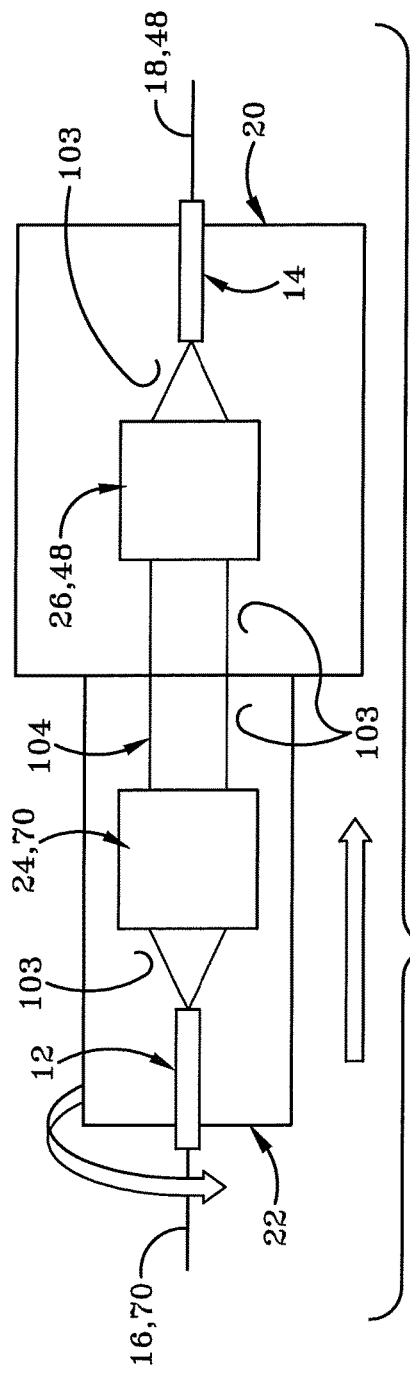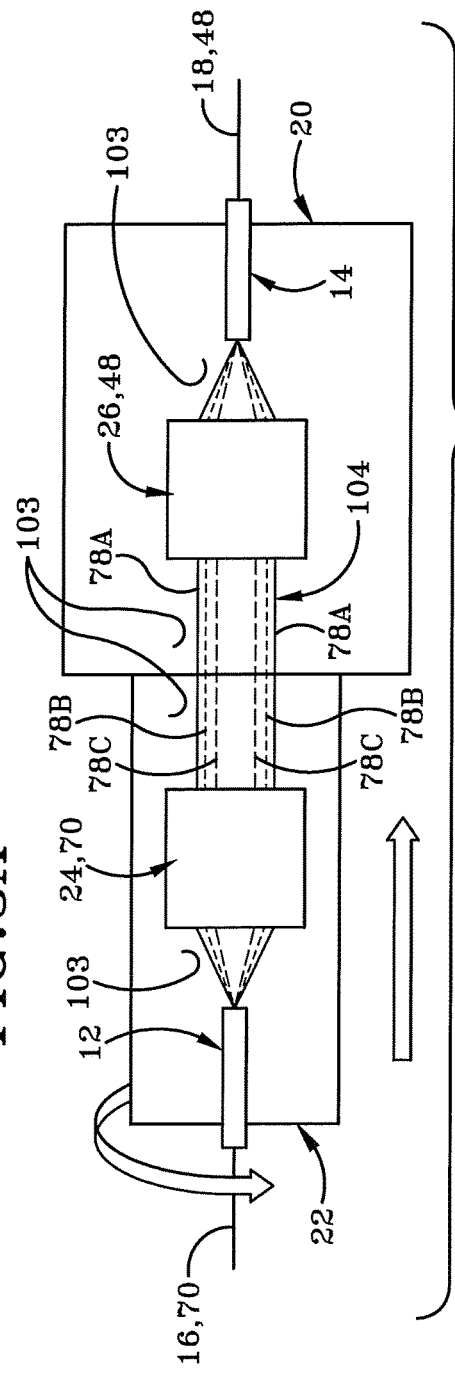

HIGH EFFICIENCY AND POWER FIBER OPTIC ROTARY JOINT

BACKGROUND

Technical Field

The present disclosure relates generally to the field of transmitting optical signals. More particularly, the present disclosure relates to transmitting optical signals via a fiber optic rotary joint. Specifically, the present disclosure relates to transmitting high power optical signals with high coupling efficiency via a fiber optic rotary joint.

Background Information

Generally, fiber optic rotary joints transmit optical signals carried by fiber optic cables through a rotary interface. Fiber optic rotary joints are typically used to transmit very low power (i.e. <<10 watts) high-speed data signals for telecommunication applications where appreciable signal loss (i.e. >25%) is often permissible based on available signal-to-noise ratios (SNR). Further, typical fiber optic rotary joints may have high insertion loss (e.g. 3 dB (50%) to 10 dB (90%)), which may limit the total power handling capabilities of typical fiber optic rotary joints.

The power limitations associated with conventional fiber optic rotary joints are driven by the design of the fiber optic cable-fiber optic cable interface. Exemplary designs include a bare-fiber optic cable air-gapped coupling where the fiber optic cables are generally held together very close to each other. Other conventional fiber optic rotary joints utilize power-limiting optics such as microlenses, gradient Index (GRIN) lenses and ball lenses. Such lenses typically cannot operate at high optical powers. Further, conventional fiber optic rotary joints are generally too lossy which may eventually lead to fiber optic cable tip failure and utilize generally small beams that may lead to reduced damage threshold limitations at high power.

SUMMARY

Issues continue to exist with transmitting optical signals via a fiber optic rotary joint. Exemplary issues are low power handling capabilities and high coupling losses. The present disclosure addresses these and other issues.

In one aspect, the present disclosure may provide a fiber optic rotary joint comprising a first fiber optic cable operably coupled to one of a stator and a rotor and a second fiber optic cable operably coupled to the other of the stator and the rotor. The stator and the rotor define a free space optical path between the first fiber optic cable and the second fiber optic cable. The rotor is rotatable about an axis of rotation parallel and collinear with an optical axis of at least one end of the fiber optic rotary joint. The fiber optic rotary joint further includes a first beam conditioning mechanism configured to condition a light beam emitted from the first fiber optic cable and a second beam conditioning mechanism configured to focus the conditioned light beam into the second fiber optic cable. A ratio of a diameter of the light beam being emitted from the first fiber optic cable to a diameter of the conditioned light beam is at least approximately 1:100.

In another aspect, the present disclosure may provide a method for transmitting optical power through a rotary interface, the method comprising emitting a light beam from a first fiber optic cable operably coupled with one of a stator or a rotor into a free space. The method includes conditioning the emitted light beam with a first beam conditioning mechanism and directing the conditioned light beam along an axis of rotation that is parallel and collinear with an optical axis of at least one end of the fiber optic rotary joint towards a second fiber optic cable operably coupled to the other of the stator or the rotor. The method includes rotating the rotor about the axis of rotation and focusing the conditioned light beam with a second beam conditioning mechanism into the second fiber optic cable. The method includes a ratio of a diameter of the light beam being emitted from the first fiber optic cable to a diameter of the conditioned light beam is at least approximately 1:100.

In another aspect, the disclosure may provide a fiber optic rotary joint including a first fiber optic cable operably coupled to one of a stator and a rotor and a second fiber optic cable operably coupled to the other of the stator and the rotor. The stator and the rotor define a free space optical path between the first fiber optic cable and the second fiber optic cable. The rotor is rotatable about an axis of rotation parallel and collinear with an optical axis of at least one end of the fiber optic rotary joint. A first beam conditioning mechanism is configured to condition a light beam emitted from the first fiber optic cable and a second beam conditioning mechanism is configured to focus the conditioned light beam into the second fiber optic cable.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3A (FIG. 3A) is a schematic representation of an embodiment of the fiber optic rotary joint including a first beam conditioning mechanism and a second beam conditioning mechanism.

FIG. 3B (FIG. 3B) is a schematic representation of an embodiment of a fiber optic rotary joint including the first beam conditioning mechanism and the second beam conditioning mechanism where the fiber optic rotary joint is operating achromatically with multiple wavelengths.

Similar numbers refer to similar parts throughout the drawings.

DETAILED DESCRIPTION

Figure 1:
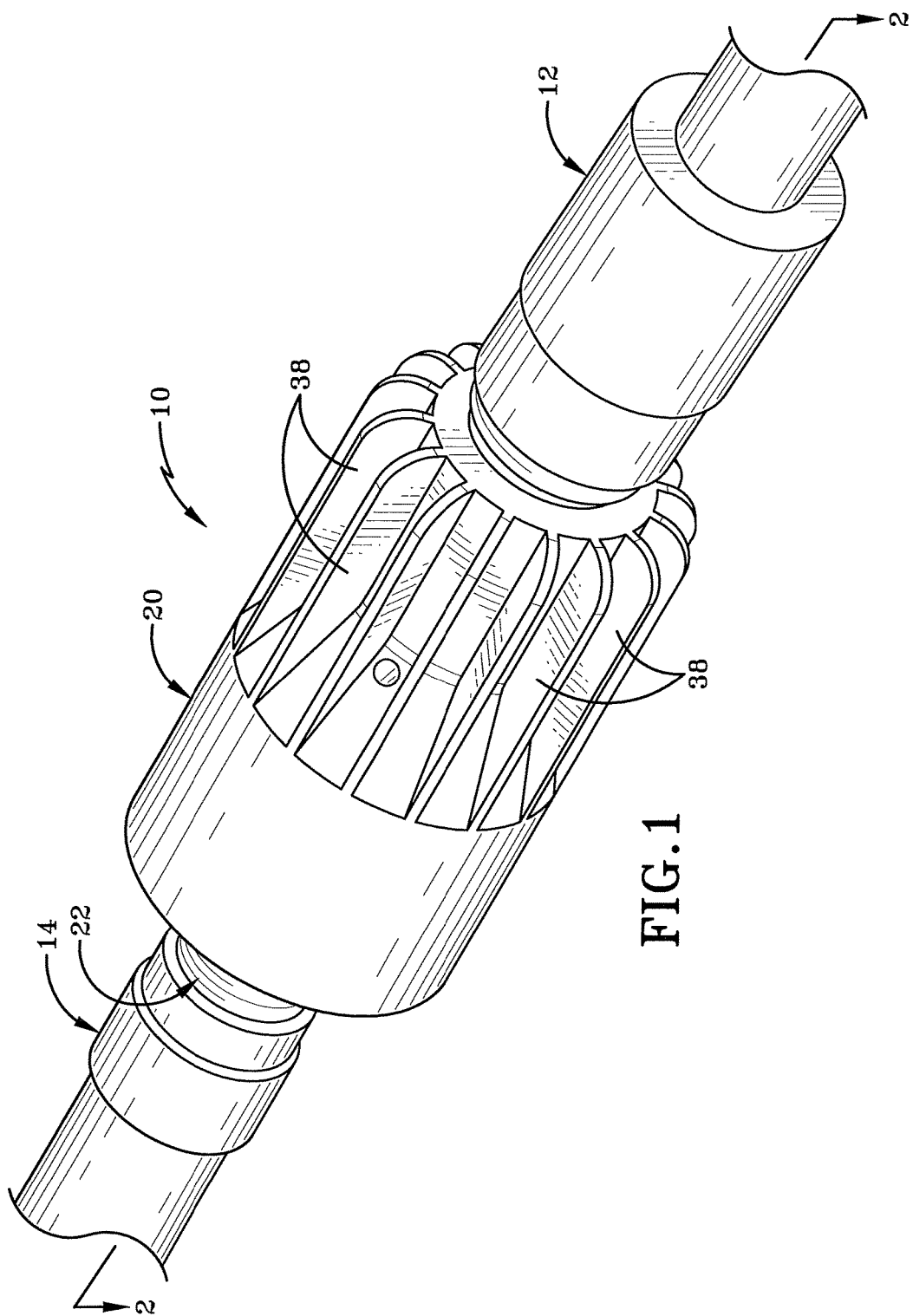
FIG. 1 (FIG. 1) is a perspective view of a fiber optic rotary joint in accordance with one aspect of the present disclosure.
Figure 2:
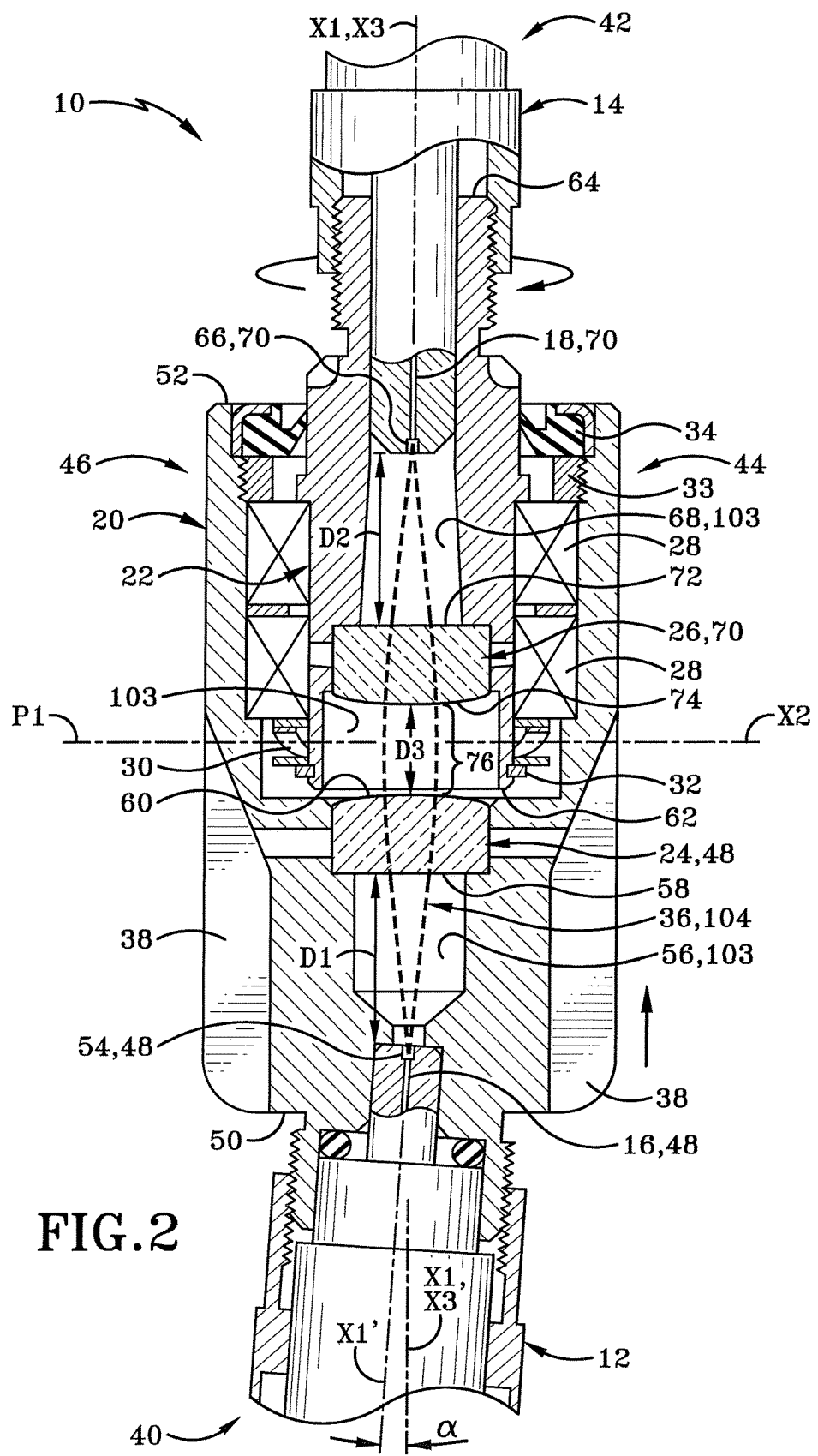
FIG. 2 (FIG. 2) is a general cross-section view of the fiber optic rotary joint taken along line 2-2 in FIG. 1.

A fiber optic rotary joint (FORJ) is generally depicted in FIG. 1 and FIG. 2 and is shown generally at 10. The FORJ 10 includes an input fiber optic connector 12, an output fiber optic connector 14, a first fiber optic cable 16, a second fiber optic cable 18, a stator 20, a rotor 22, a first beam conditioning mechanism 24, a second beam conditioning mechanism 26, at least one bearing 28, at least one wave spring 30, a retaining ring 32, a mounting ring 33, a dynamic environmental seal 34, a light beam 36 and at least one radial fin 38.

The FORJ 10 includes a first end 40 and a second end 42 defining a longitudinal direction therebetween. The first end 40 and the second end 42 define a longitudinal axis X1 extending along the center of the FORJ 10 from the second end 42 towards the first end 40. The FORJ 10 further includes a right side 44 and a left side 46 defining a transverse direction therebetween. The right side 44 and the left side 46 define a transverse axis X2 extending along the center of the FORJ 10 from the right side 44 to the left side 46.

In one example, the input fiber optic connector 12 is a single-mode angled physical contact (FC/APC) connector; however, any suitable fiber optic connector may be utilized as one of ordinary skill in the art would understand. A longitudinally extending offset axis X1' is defined through the center of the input fiber optic connector 12, as shown in FIG. 2, which is offset from the longitudinal axis X1 by an angle α. In one example, the angle α is 8 degrees, however, the angle α may be any suitable angle. The angled design associated with the FC/APC connector is suitable because it significantly reduces the potential reflected feedback to a light beam source (not shown), which may cause damage to the light beam source. Further, the FC/APC connector may be end-capped and may be anti-reflection coated which significantly decreases device insertion loss and increases total power handling capabilities of the FORJ 10.

The input fiber optic connector 12 is operably coupled to the first fiber optic cable 16, the stator 20, and the first beam conditioning mechanism 24 in any suitable manner. In one example, the first fiber optic cable 16 and the first beam conditioning mechanism 24 form a stator subassembly 48 which is housed within the stator 20 in any suitable manner.

In one aspect according to the present disclosure, the first fiber optic cable 16 is a single-mode fiber optic cable; however, any suitable fiber optic cable may be utilized as one of ordinary skill in the art would understand. A single-mode fiber optic cable supports a single high-quality Gaussian mode which transmits through the fiber optic cable regardless of any perturbations. An exemplary single-mode fiber optic cable that may be used is a Nufern 16/242, 0.09NA (SMF Nufern) single-mode fiber optic cable purchased from Nufern, Inc., 7 Airport Park Road, East Granby, Conn. 06026-9523 (Nufern). As one of ordinary skill in the art would understand, other suitable single-mode fiber optic cables may be utilized.

With continued reference to FIG. 2, the stator 20 is generally cylindrical and includes a first end 50 and a second end 52. In one example, the stator 20 is monolithic and may be formed from any suitable material; however, the stator 20 may also be integrally formed as one of ordinary skill in the art would understand. The monolithic structure aids in achieving accurate dimensional tolerances that are required between a tip 54 of the input fiber optic connector 12 and the first beam conditioning mechanism 24. The longitudinal axis X1 extends in a longitudinal direction through the center of the stator 20 from the first end 50 towards the second end 52. The stator 20 defines a longitudinally horizontal bore 56 extending the length thereof. The longitudinally horizontal bore 56 is sized so that the stator 20 houses and/or is operably coupled with the input fiber optic connector 12, the first fiber optic cable 16, the first beam conditioning mechanism 24 and the rotor 22.

As shown in FIG. 2, the tip 54 of the input fiber optic connector 12 is located a distance D1 from the first beam conditioning mechanism 24 which can be referred to as the fiber-plano vertex spacing. In other words, the fiber-plano vertex spacing is the distance between the tip 54 and the first surface of the beam conditioning mechanism 24. The distance D1 may be any suitable distance.

In one embodiment according to the present disclosure, the first beam conditioning mechanism 24 is a plano-convex lens. The plano-convex lens may be referred to herein as plano-convex lens 24. The plano-convex lens 24 includes a generally planar surface 58 and a generally convex surface 60. The generally planar surface 58 of the plano-convex lens 24 is oriented so that the generally planar surface 58 is facing towards the tip 54 of the input fiber optic connector 12 and towards the first end 50 of the stator 20 as shown in FIG. 2. The plano-convex lens 24 is fixedly retained within the stator 20 in any suitable manner. Although the first beam conditioning mechanism 24 has been described as including a single plano-convex lens 24, the first beam conditioning mechanism 24 may include other suitable optics configurations.

With reference to FIG. 2, and in one embodiment according to the present disclosure, the stator 20 is operably coupled to the rotor 22 via the at least one bearing 28. The at least one bearing 28 is a high precision x-type bearing, which is also referred to as a four-point contact bearing because the bearing has four points of contact to carry various types of loading (i.e. radial, axial and moment). In one aspect according to the present disclosure, the at least one bearing 28 has a tolerance grade of ABEC-7 which provides high precision and accuracy. The ABEC scale is an industry accepted standard for the tolerances of a ball bearing developed by the Annular Bearing Engineering Committee (ABEC) of the American Bearing Manufacturers Association (ABMA). There are seven classes from largest to smallest tolerances: 1, 3, 5, 7 and 9. The higher ABEC classes provide better precision, efficiency, and the possibility of greater speed capabilities.

With reference to FIG. 2, and in one example according to the present disclosure, the at least one bearing 28 is a duplex bearing arrangement and is fixedly retained within the stator 20 by the mounting ring 33. Further, the at least one bearing 28 is pre-loaded using the at least one wave spring 30 as shown in FIG. 2 along the axis of rotation X1 to provide precise axial and radial positions of the stator 20 relative to the rotor 22. The at least one wave spring 30 is held within the stator by the retaining ring 32 which is disposed near the first end 62 of the rotor 22. Although a particular bearing arrangement has been identified, other bearing arrangements may be utilized as one of ordinary skill in the art would understand.

With reference to FIG. 2, the rotor 22 is generally cylindrical and is driven by a drive mechanism (not shown). The rotor 22 is bearingly supported by the at least one bearing 28 and is operably coupled to the stator 20. The rotor 22 includes a first end 62 and a second end 64. In one example, the rotor 22 is monolithic and may be formed from any suitable material; however, the rotor 20 may also be integrally formed as one of ordinary skill in the art would understand. The monolithic structure aids in achieving accurate dimensional tolerances that are required between a tip 66 of the output fiber optic connector 14 and the second beam conditioning mechanism 26. The longitudinal axis X1 extends in a longitudinal direction through the center of the rotor 22 from the first end 62 towards the second end 64. In one example, the longitudinal axis X1 is also the axis of rotation X1 of the rotor 22 where the rotor 22 rotates relative to the stator 20. In another example, the axis of rotation X1 of the rotor 22 may be configured in any suitable manner. For example, in the event the first end 40 of the FORJ 10 is not coaxial to the second end 42 of the FORJ 10, the axis of rotation X1 of the rotor 22 may extend through the rotor 22 in any suitable manner.

The rotor 22 defines a longitudinally horizontal bore 68 extending the length thereof. The longitudinally horizontal bore 68 is sized so that the rotor 22 houses and/or is operably coupled with the output fiber optic connector 14, the second fiber optic cable 18, the second beam conditioning mechanism 26 and the stator 20.

With reference to FIG. 2, the tip 66 of the output fiber optic connector 14 is located a distance D2 from the second beam conditioning mechanism 26. The distance D2 may be any suitable distance. In one example according to the present disclosure, the second beam conditioning mechanism 26 is a plano-convex lens 26 including a generally planar surface 72 and a generally convex surface 74. The generally planar surface 72 of the plano-convex lens 26 is oriented so that the generally planar surface 72 is facing towards the tip 66 of the output fiber optic connector 14 and towards the second end 64 of the rotor 22 as shown in FIG. 2. The plano-convex lens 26 is fixedly retained within the rotor 22 in any suitable manner. Although the second beam conditioning mechanism 26 has been described as including a single plano-convex lens 26, the second beam conditioning mechanism 26 may include other suitable optics configurations.

In one example according to the present disclosure, the second fiber optic cable 18 and the second beam conditioning mechanism 26 form a rotor subassembly 70 which is housed within the rotor 22 in any suitable manner.

In one aspect according to the present disclosure, the second fiber optic cable 18 is a multi-mode fiber optic cable; however, any suitable fiber optic cable may be utilized as one of ordinary skill in the art would understand. A multi-mode fiber optic cable has a larger core diameter and/or larger acceptance angle than a single-mode fiber which allows for efficient coupling of the light beam into the multi-mode fiber optic cable. In one embodiment according to the present disclosure, an exemplary multi-mode fiber optic cable that may be used is a Nufern 50/125, 0.22NA (MMF Nufern) multi-mode fiber optic cable purchased from Nufern, Inc., 7 Airport Park Road, East Granby, Conn. 06026-9523 (Nufern). As one of ordinary skill in the art would understand, other suitable multi-mode fiber optic cables may be utilized.

With reference to FIG. 2, the dynamic environmental seal 34 is arranged between the stator 20 and the rotor 22 for dynamically sealing the operable coupling of the stator 20 and the rotor 22. In one example according to the present disclosure, the dynamic environmental seal 34 is a shaft seal 34 which prevents the ingress of contaminants.

In one example, the generally convex surface 60 of the plano-convex lens 24 is located a distance D3 from the generally convex surface 74 of the plano-convex lens 26. The distance D3 may be any suitable distance. In one example, the FORJ 10 further includes a plane of rotation P1 which extends through the transverse axis X2 and is perpendicular to the longitudinal axis X1. Although a particular orientation of the plane of rotation P1 has been described, the plane of rotation P1 may be disposed within the FORJ 10 in any suitable manner. For example, the plane of rotation P1 may be disposed between the first beam conditioning mechanism 24 and the second beam conditioning mechanism 26 in any suitable manner.

With reference to FIG. 3A and FIG. 3B, and in another embodiment according to the present disclosure, the FORJ 10 includes the input fiber optic connector 12, the output fiber optic connector 14, the first fiber optic cable 16, the second fiber optic cable 18, the stator 20, the rotor 22, the first beam conditioning mechanism 24 and the second beam conditioning mechanism 26.

As shown in FIG. 3A and FIG. 3B, and in one example, the input fiber optic connector 12 is operably coupled to the first fiber optic cable 16, the rotor 22, and the first beam conditioning mechanism 24 in any suitable manner. In one example, the first fiber optic cable 16 and the first beam conditioning mechanism 24 form the rotor subassembly 70 which is housed within the rotor 22 in any suitable manner.

With reference to FIG. 3A and FIG. 3B, the output fiber optic connector 14 is operably coupled to the second fiber optic cable 18, the stator 20, and the second beam conditioning mechanism 26 in any suitable manner. In one embodiment according to the present disclosure, the second fiber optic cable 18 and the second beam conditioning mechanism 26 form the stator subassembly 48 which is housed within the stator 20 in any suitable manner.

With reference to FIG. 3B, the light beam 36 includes multiple wavelengths 78A, 78B and 78C. Specifically, the FORJ 10 depicted in FIG. 3B, operates achromatically and transmits three distinct wavelengths 78A, 78B and 78C of the propagated light beam 36 from the first fiber optic cable 16 to the second fiber optic cable 18.

Figure 4A:
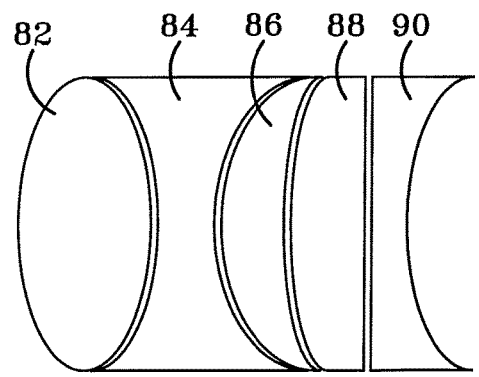
FIG. 4A (FIG. 4A) is a schematic representation of an embodiment of the first or second beam conditioning mechanism including a random arrangement of lenses including a bi-convex lens, a bi-concave lens, a meniscus lens, a plano-convex lens and a plano-concave lens.

As mentioned above, the first beam conditioning mechanism 24 and the second beam conditioning mechanism 26 may utilize any suitable optics (e.g. transparent optics with anti-reflective coatings) and optics configurations. In one embodiment according to the present disclosure, the parameters of the light beam 36 that may be modified include, but are not limited to, light beam 36 diameter, divergence, circularity, and astigmatism. For example, and not meant as a limitation, the first and second beam conditioning mechanisms 24, 26 may include various components arranged in a beam conditioning optics module 80 in any suitable manner or configuration. In one example, and with reference to FIG. 4A, the beam conditioning optics module 80 includes a bi-convex lens 82, a bi-concave lens 84, a meniscus lens 86, a plano-convex lens 88 and a plano-concave lens 90.

Although the first beam conditioning mechanism 24 and the second beam conditioning mechanism 26 may utilize any suitable optics and optics configurations, in one example, the first beam conditioning mechanism 24 and the second beam conditioning mechanism are free of power-limiting optics which may include, but are not limited to, microlenses, gradient Index (GRIN) lenses and ball lenses and any other power-limiting optics as one of ordinary skill in the art would understand.

Figure 4B:
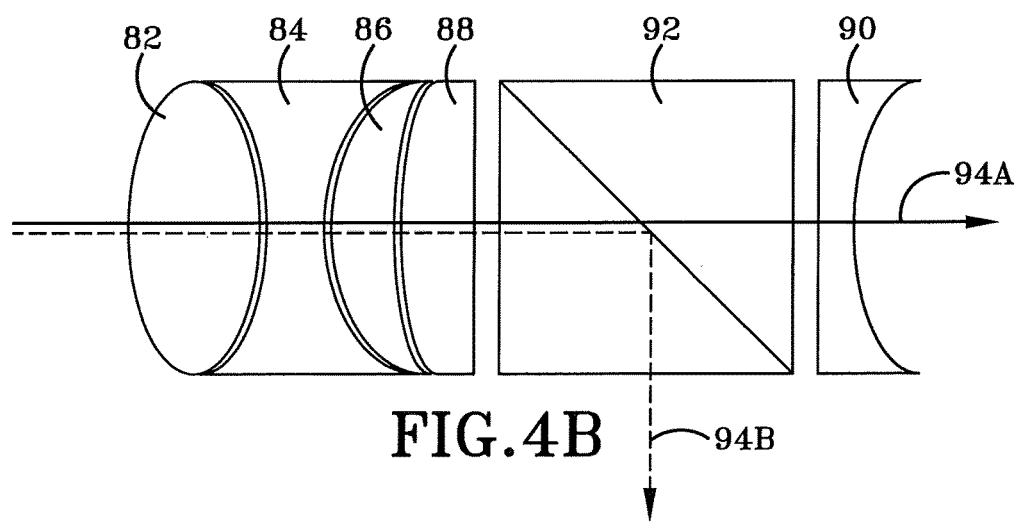
FIG. 4B (FIG. 4B) is a schematic representation of an embodiment of the first or second beam conditioning mechanism including a polarizing action.

In another embodiment according to the present disclosure, and with reference to FIG. 4B, an exemplary beam conditioning optics module 80 with polarizer action is depicted. The beam conditioning optics module 80 in this embodiment includes the bi-convex lens 82, the bi-concave lens 84, the meniscus lens 86, the plano-convex lens 88, a polarization sensitive optic 92 and the plano-concave lens 90. In one example, and as depicted in FIG. 4B, a first wavelength 94A and a second wavelength 94B of the propagated light beam 36 are polarized. In one example, the polarization sensitive optic 92 is a polarizing beam splitter, however, any suitable polarization sensitive optic 92 may be utilized. For example, and not meant to be limiting, the polarization sensitive optic 92 may be a thin-film polarizer or a waveplate.

Figure 4C:
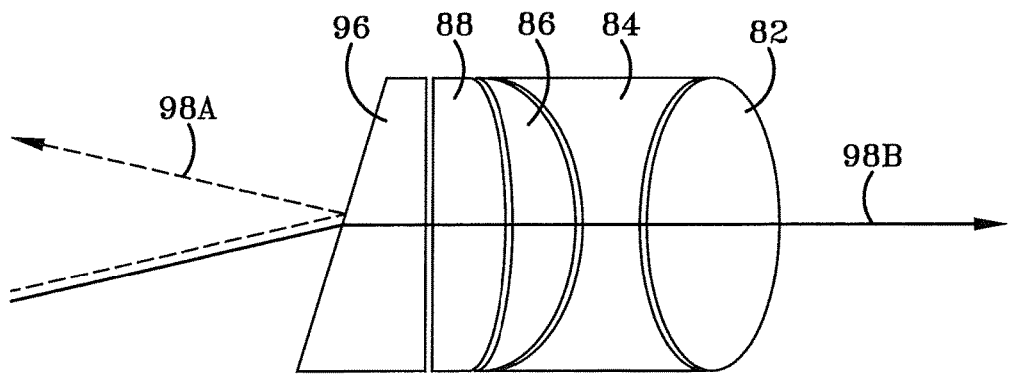
FIG. 4C (FIG. 4C) is a schematic representation of an embodiment of the first beam or second conditioning mechanism including a spectral filter.

With reference to FIG. 4C, an exemplary beam conditioning optics module 80 with a spectral filter is depicted. The beam conditioning optics module 80 in this example includes a spectral filter 96, the plano-convex lens 88, the meniscus lens 86, the bi-concave lens 84 and the bi-convex lens 82. In one example, and as depicted in FIG. 4C, a first wavelength 98A and a second wavelength 98B are directed towards the spectral filter wedge. In one embodiment according to the present disclosure, the spectral filter mechanism 96 is a spectral filter wedge, however, any suitable spectral filter mechanism 96 may be utilized.

The following are simulation results obtained using ZEMAX, which is industrial software most commonly used for lens design and optical analysis. Specifically, an opto-mechanical sensitivity model was developed in ZEMAX. The opto-mechanical sensitivity model was used to analyze overall coupling efficiency as a function of radial centration errors (decenter), longitudinal spacing errors (defocus) and angular tilt errors where the first fiber optic cable 16 is a single-mode fiber optic cable, the SMF Nufern, and the second fiber optic cable 18 is a multi-mode fiber optic cable, the MMF Nufern. Further, each model was performed utilizing sets of plano-convex lenses 24 having different radii of curvature (ROC). For example, one simulation was performed utilizing two plano-convex lenses 24 each having a radius of curvature of 13.91 mm, and another simulation was performed utilizing two plano-convex lenses 24 each having a radius of curvature of 12.27.

In one example, the input values of the SMF Nufern (single-mode fiber) are as follows: a fiber core diameter of 16.0000 µm, a wavelength of 1.9080 µm and a numerical aperture (NA) of 0.900. In one example, the computed values of the SMF Nufern are as follows: a computed V number of 2.3710, a mode field diameter (MFD)/fiber core diameter of 1.0900, an MFD of 17.4392 µm and a mode field radius of 8.7196 µm.

In one example, the input values of the MMF Nufern (multi-mode fiber) are as follows: a fiber core diameter of 50.0000 µm, a wavelength of 1.9080 µm and a numerical aperture (NA) of 0.2200. In one example, the computed values of the MMF Nufern are as follows: a computed V number of 18.1119, a mode field diameter (MFD)/fiber core diameter of 0.6550, an MFD of 32.7502 µm and a mode field radius of 16.3751 µm.

Each type of error was evaluated between the input half (i.e. first fiber optic cable 16 and the first beam conditioning mechanism 24 as a group) and the output half (i.e. the second beam conditioning mechanism 26 and the second fiber optic cable 18 as a group). In one example, these types of errors are referred to as "Mid-plane" errors.

In addition, all three error types were also analyzed between each tip 54, 66 and their corresponding beam conditioning mechanisms 24, 26 respectively. In one example, these errors are referred to as "Fiber" errors.

In one aspect according to the present disclosure, the following misalignments have the following descriptions. Decenter at Mid-plane occurs when the first and second beam conditioning mechanisms 24, 26 are not centered with respect to one another. Tilt at Mid-plane occurs when the center of the first and second beam conditioning mechanisms 24, 26 are aligned but the second beam conditioning mechanism 26 is offset by an angle. Tilt at the first fiber optic cable 16/second fiber optic cable 18 occurs when the first fiber optic cable 16/second fiber optic cable 18 is offset by an angle. Transverse offset at the first fiber optic cable 16/second fiber optic cable 18 occurs when the first fiber optic cable 16/second fiber optic cable 18 is not centered with respect to the first and second beam conditioning mechanisms 24, 26. Axial spacing offset at the first fiber optic cable 16/second fiber optic cable 18 occurs when the first fiber optic cable 16/second fiber optic cable 18 is not the correct distance from first and second beam conditioning mechanisms 24, 26 (i.e. the fiber-plano vertex spacing is wrong).

In one embodiment according to the present disclosure, and as depicted in FIG. 5A-FIG. 7C, the coupling efficiency of the transmitted light beam 36 from the first fiber optic cable 16 to the second fiber optic cable 18 is at least ninety percent.

Figure 5A:
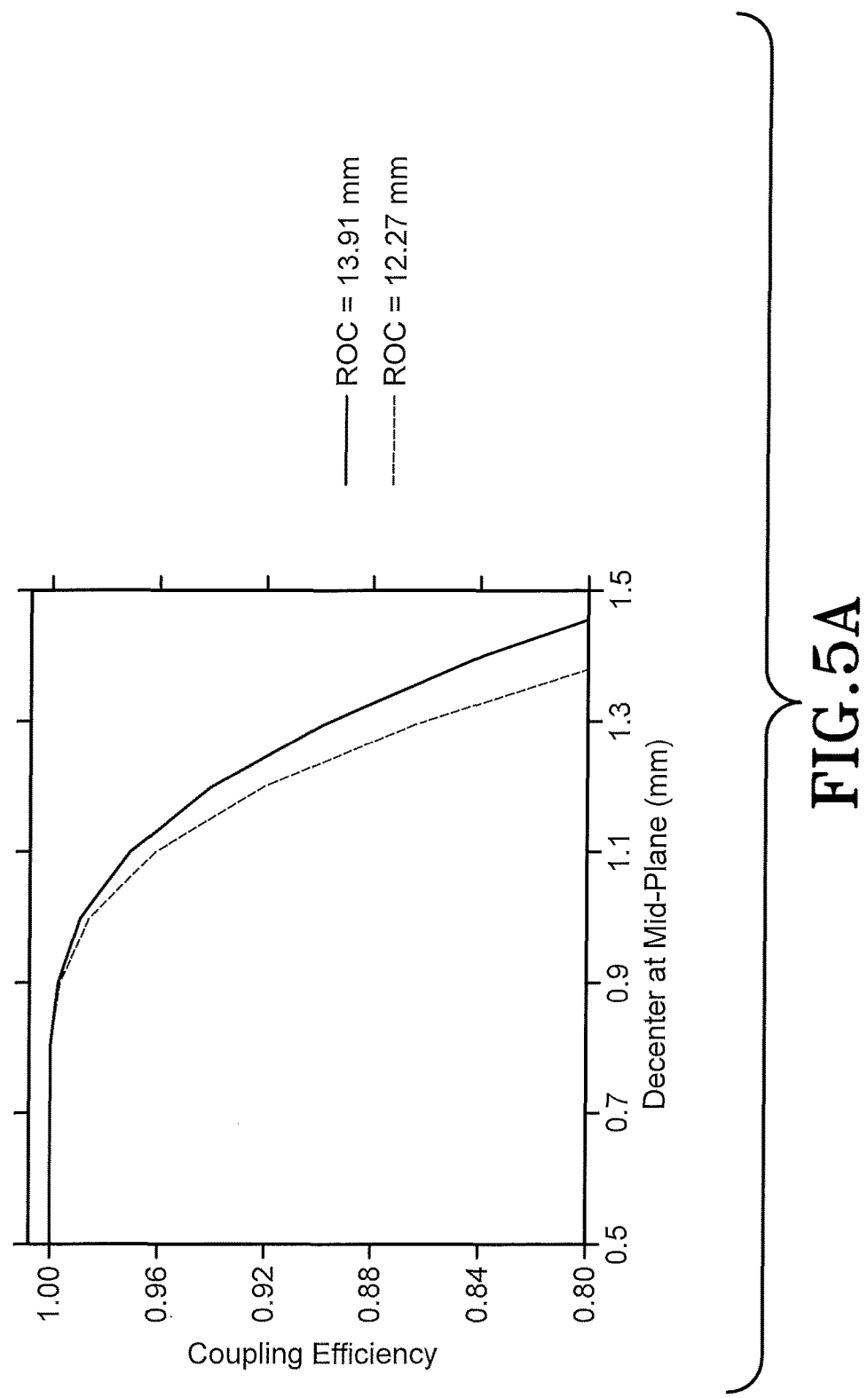
FIG. 5A (FIG. 5A) is a graph representing coupling efficiency for a configuration where the first fiber optic cable is a single-mode fiber optic cable and the second fiber optic cable is a multi-mode fiber optic cable with respect to decenter at mid-plane (mm).
Figure 5B:
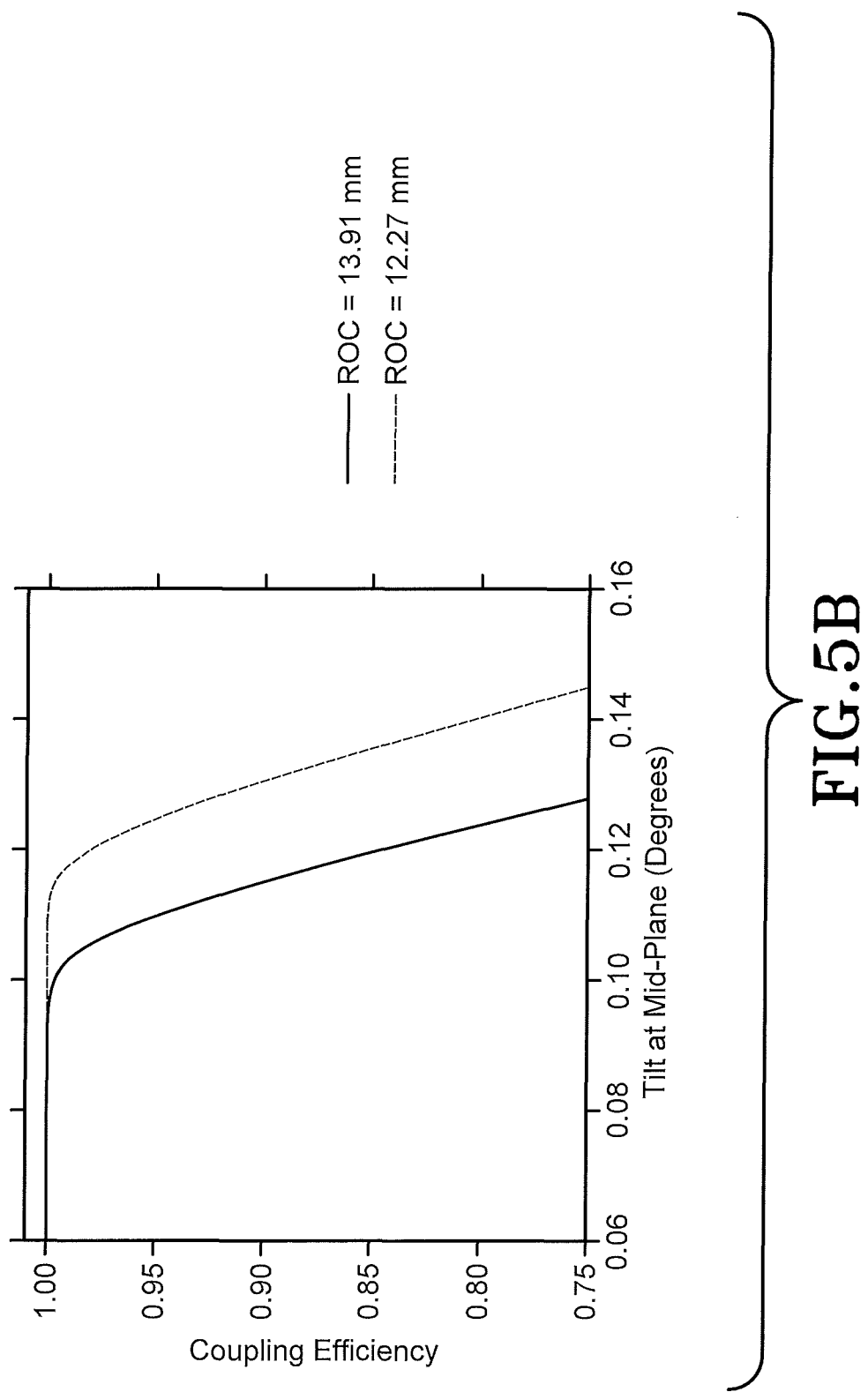
FIG. 5B (FIG. 5B) is a graph representing coupling efficiency for a configuration where the first fiber optic cable is a single-mode fiber optic cable and the second fiber optic cable is a multi-mode fiber optic cable with respect to tilt at mid-plane (degrees).

FIG. 5A is a graph representing coupling efficiency for a configuration where the first fiber optic cable 16 is the SMF Nufern and the second fiber optic cable 18 is the MMF Nufern with respect to decenter at mid-plane (mm). FIG. 5B is a graph representing coupling efficiency for a configuration where the first fiber optic cable 16 is the SMF Nufern and the second fiber optic cable 18 is the MMF Nufern with respect to tilt at mid-plane (degrees). The solid line in FIG. 5A and FIG. 5B represents the set of plano-convex lenses 24 having radii of curvature of 13.91. The dashed line in FIG. 5A and FIG. 5B represents the set of plano-convex lenses 24 having radii of curvature of 12.27. FIG. 5A and FIG. 5B show that while the plano-convex lenses 24 having radii of curvature of 12.27 mm are more sensitive to decenter at Mid-plane, the same set of plano-convex lenses 24 are less sensitive to tilt at Mid-plane (degrees).

Figure 6A:
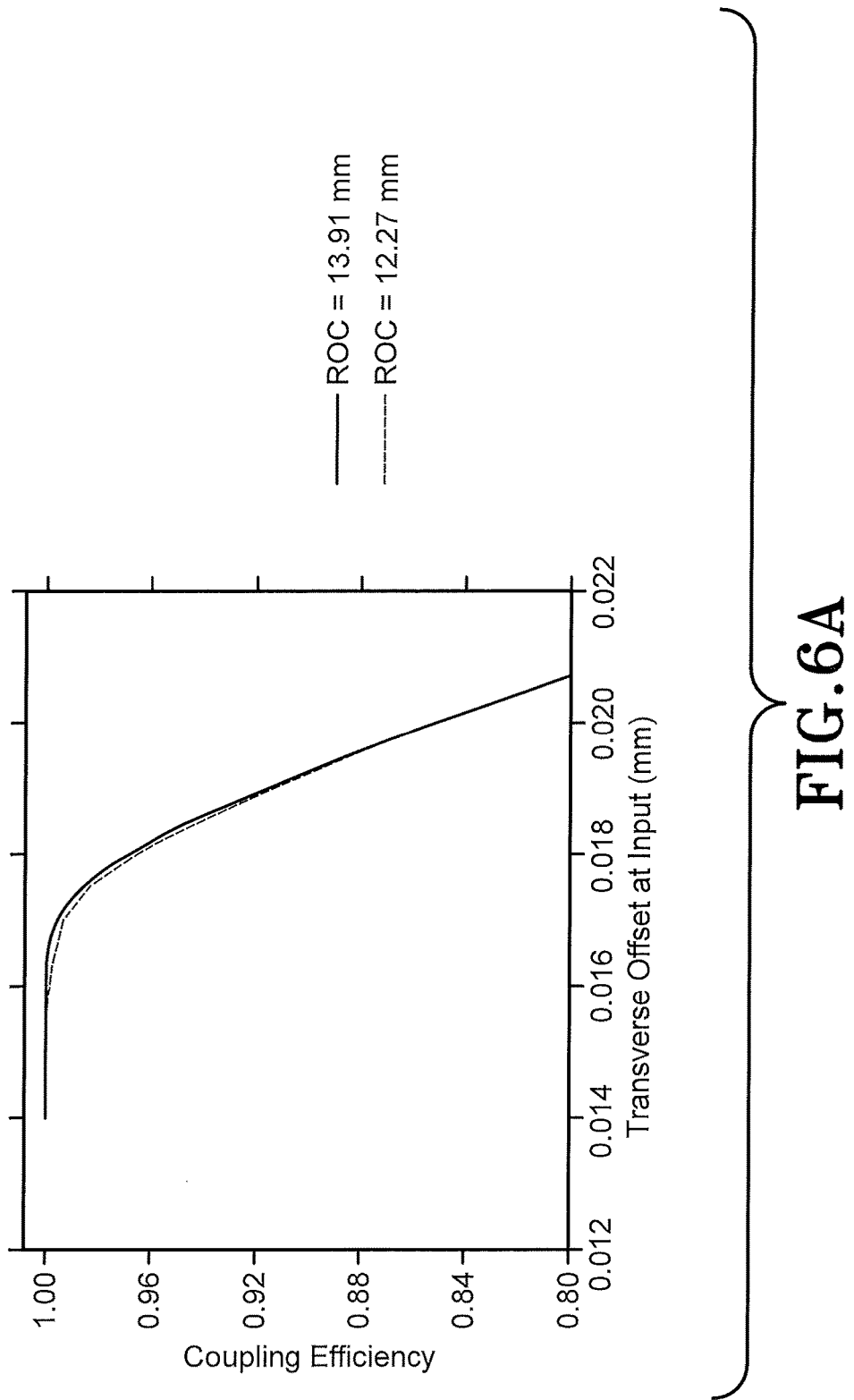
FIG. 6A (FIG. 6A) is a graph representing coupling efficiency for a configuration where the first fiber optic cable is a single-mode fiber optic cable and the second fiber optic cable is a multi-mode fiber optic cable with respect to transverse offset at input (mm).
Figure 6B:
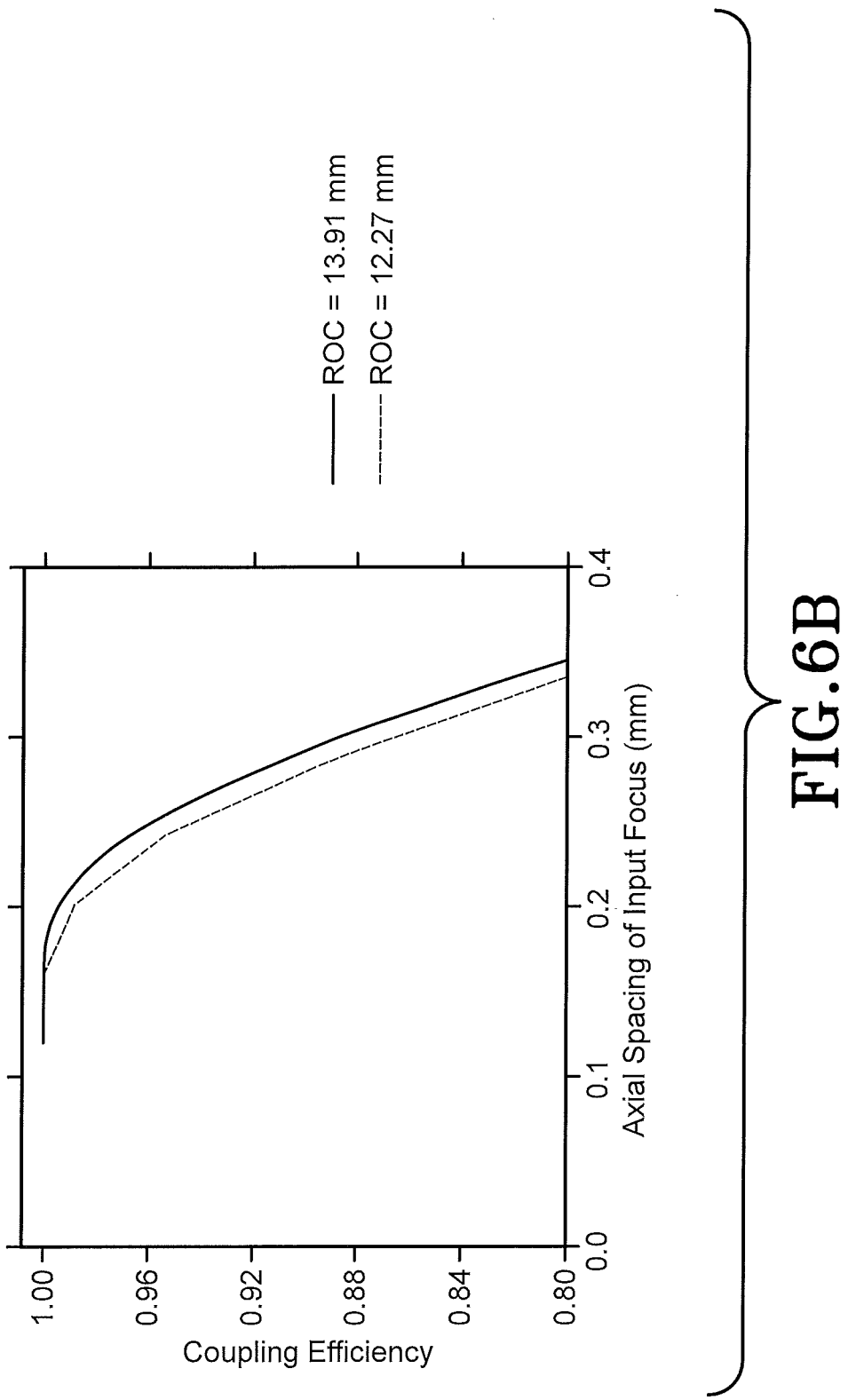
FIG. 6B (FIG. 6B) is a graph representing coupling efficiency for a configuration where the first fiber optic cable is a single-mode fiber optic cable and the second fiber optic cable is a multi-mode fiber optic cable with respect to axial spacing of input focus (mm).
Figure 6C:
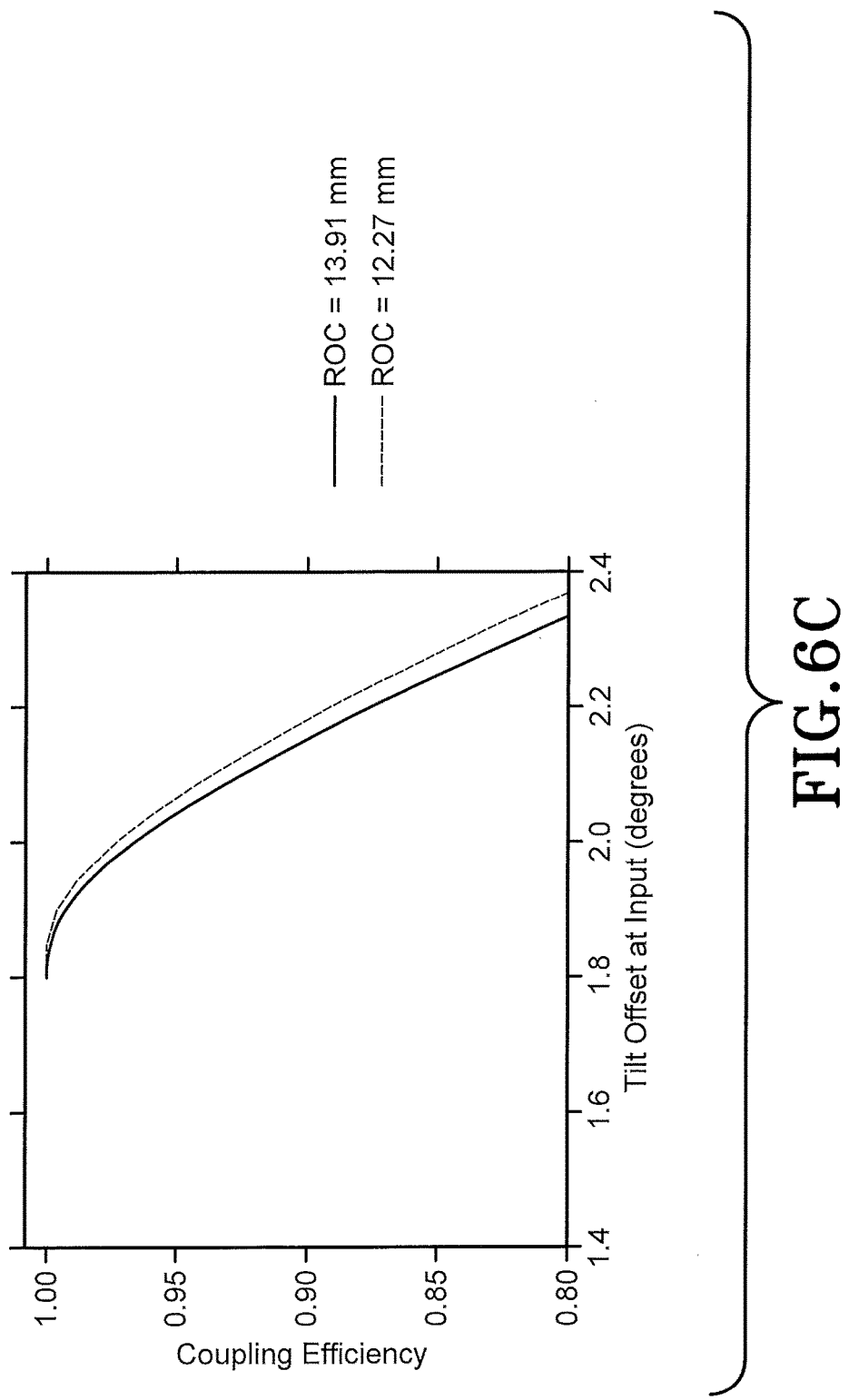
FIG. 6C (FIG. 6C) is a graph representing coupling efficiency for a configuration where the first fiber optic cable is a single-mode fiber optic cable and the second fiber optic cable is a multi-mode fiber optic cable with respect to tilt offset at input (mm).

FIG. 6A (FIG. 6A) is a graph representing coupling efficiency for a configuration where the first fiber optic cable 16 is the SMF Nufern and the second fiber optic cable 18 is the MMF Nufern with respect to transverse offset at input (mm). FIG. 6B (FIG. 6B) is a graph representing coupling efficiency for a configuration where the first fiber optic cable 16 is the SMF Nufern and the second fiber optic cable 18 is the MMF Nufern with respect to axial spacing of input focus (mm). FIG. 6C (FIG. 6C) is a graph representing coupling efficiency for a configuration where the first fiber optic cable 16 is the SMF Nufern and the second fiber optic cable 18 is the MMF Nufern with respect to tilt offset at input (mm). The solid line in FIG. 6A, FIG. 6B and FIG. 6C represents the set of plano-convex lenses 24 having radii of curvature of 13.91. The dashed line in FIG. 6A, FIG. 6B and FIG. 6C represents the set of plano-convex lenses 24 having radii of curvature of 12.27.

Figure 7A:
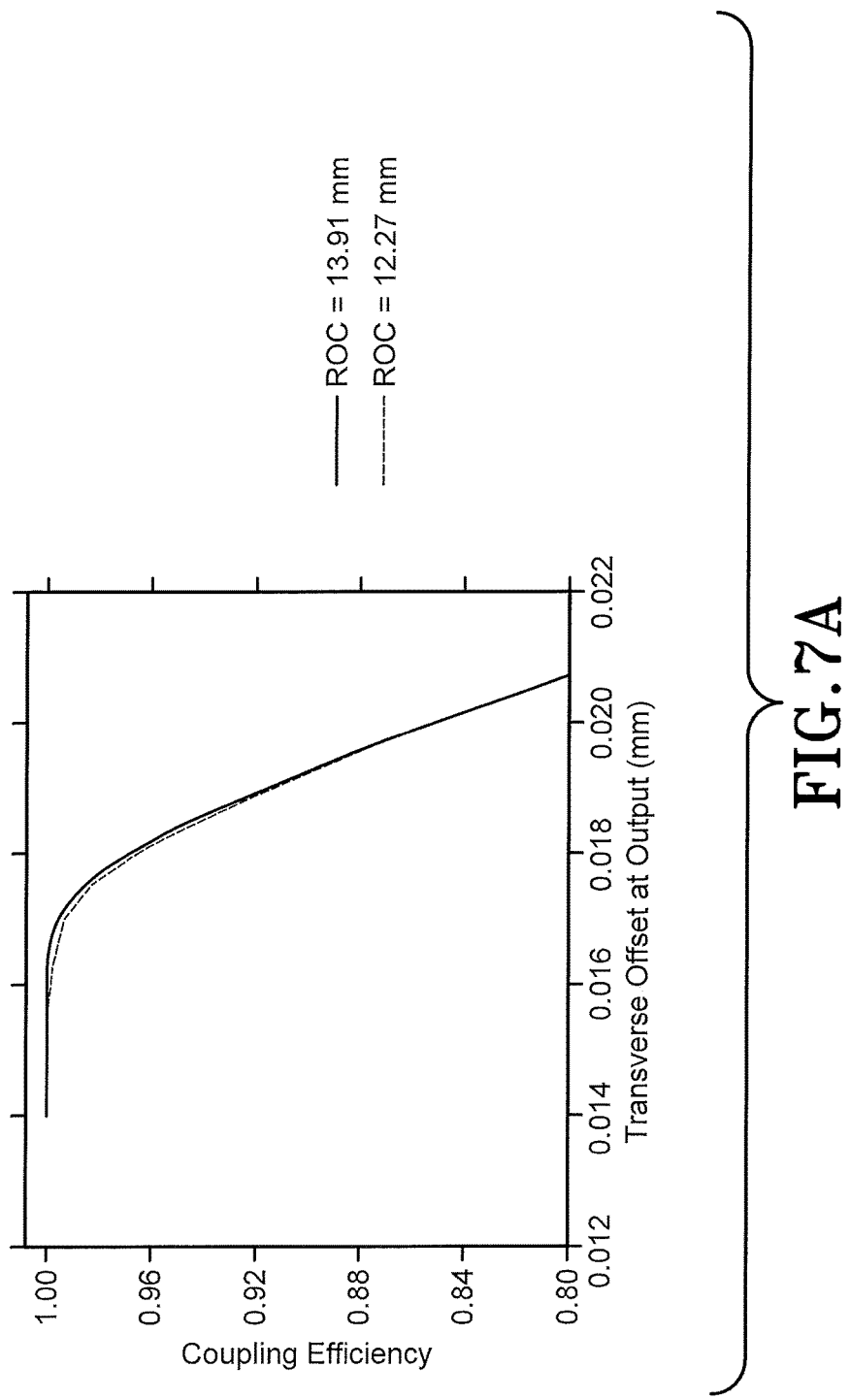
FIG. 7A (FIG. 7A) is a graph representing coupling efficiency for a configuration where the first fiber optic cable is a single-mode fiber optic cable and the second fiber optic cable is a multi-mode fiber optic cable with respect to transverse offset at input (mm).
Figure 7B:
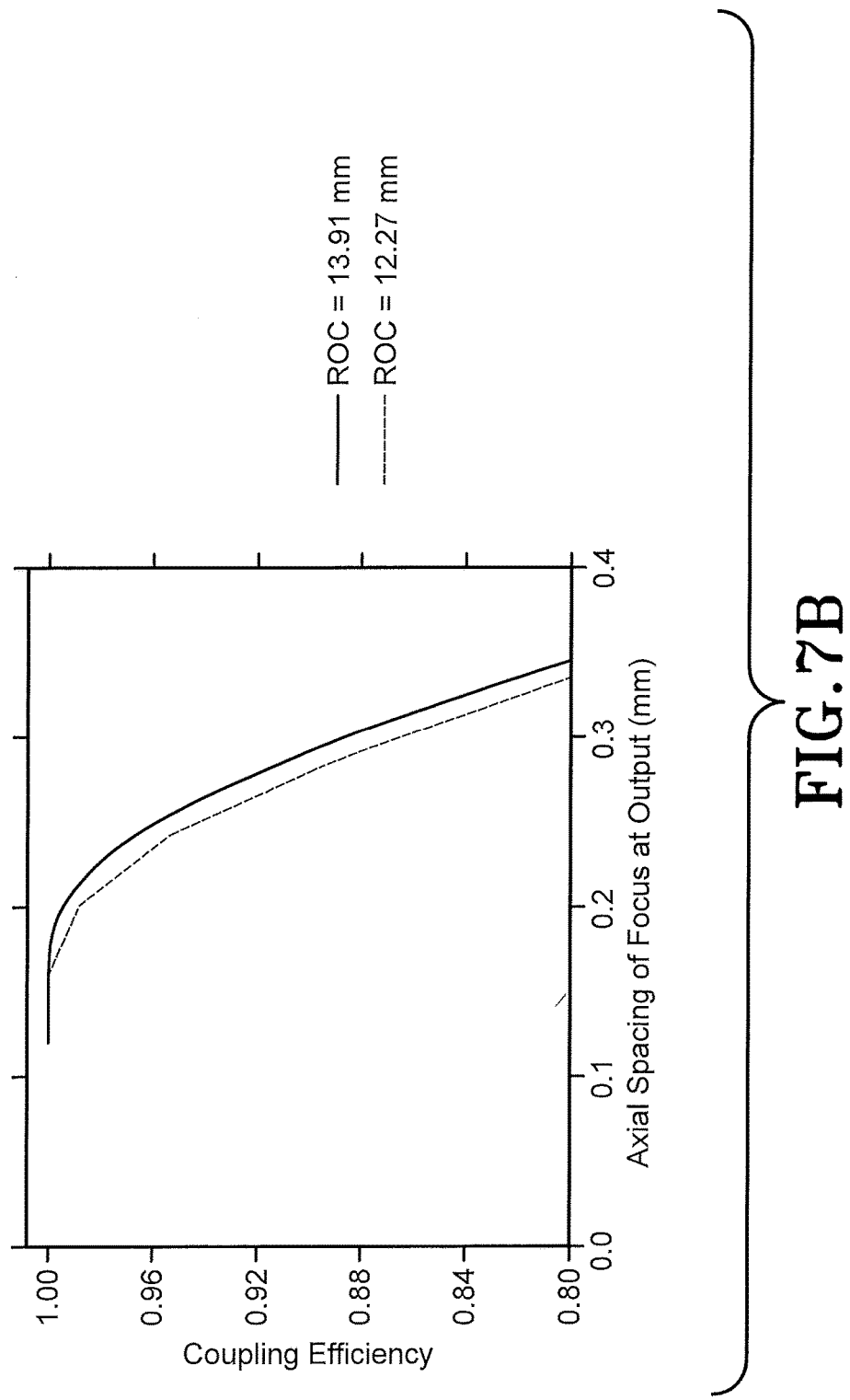
FIG. 7B (FIG. 7B) is a graph representing coupling efficiency for a configuration where the first fiber optic cable is a single-mode fiber optic cable and the second fiber optic cable is a multi-mode fiber optic cable with respect to axial spacing of input focus (mm).
Figure 7C:
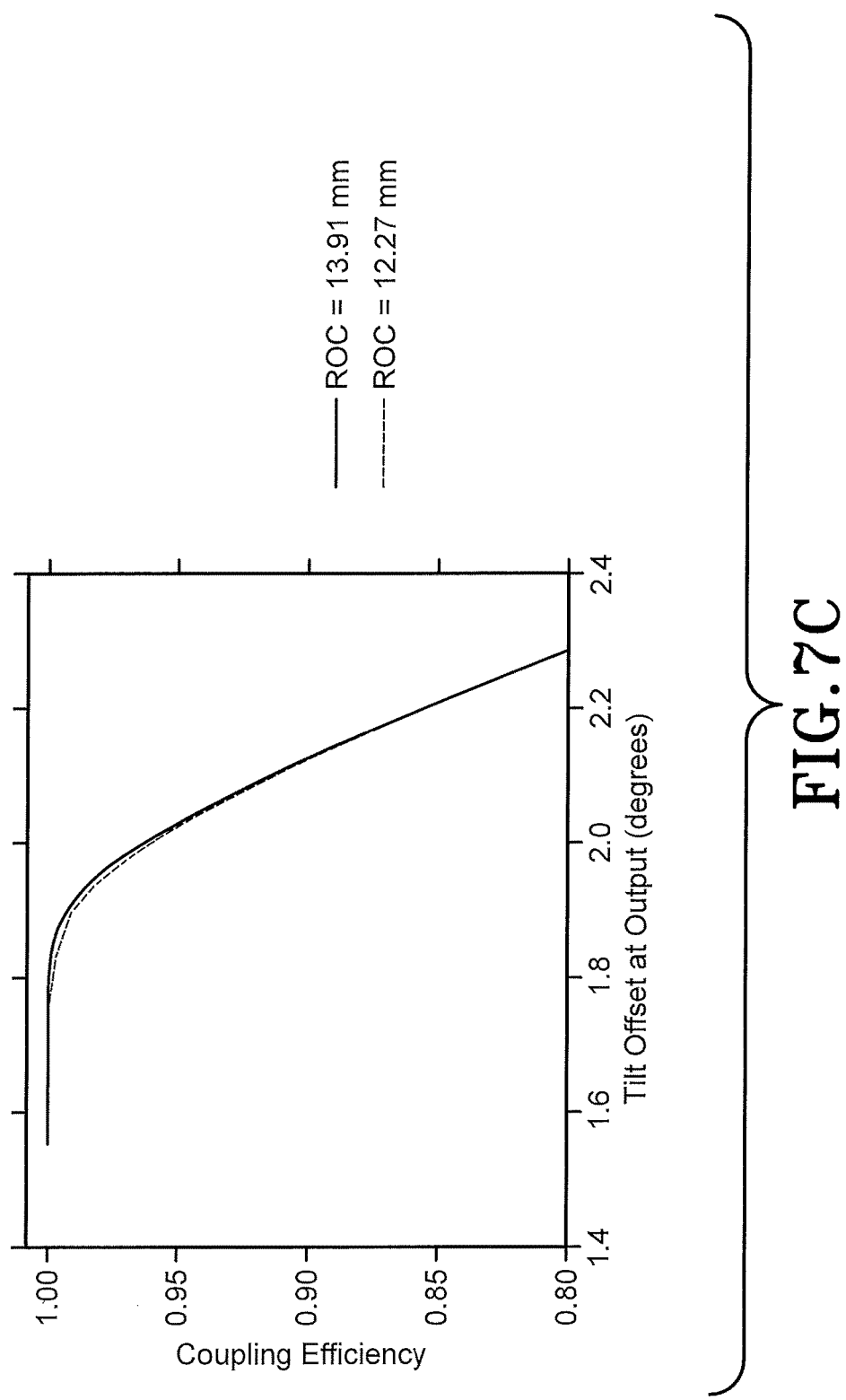
FIG. 7C (FIG. 7C) is a graph representing coupling efficiency for a configuration where the first fiber optic cable is a single-mode fiber optic cable and the second fiber optic cable is a multi-mode fiber optic cable with respect to tilt offset at input (mm).

FIG. 7A (FIG. 7A) is a graph representing coupling efficiency for a configuration where the first fiber optic cable 16 is the SMF Nufern and the second fiber optic cable 18 is the MMF Nufern with respect to transverse offset at input (mm). FIG. 7B (FIG. 7B) is a graph representing coupling efficiency for a configuration where the first fiber optic cable 16 is the SMF Nufern and the second fiber optic cable 18 is the MMF Nufern with respect to axial spacing of input focus (mm). FIG. 7C (FIG. 7C) is a graph representing coupling efficiency for a configuration where the first fiber optic cable 16 is the SMF Nufern and the second fiber optic cable 18 is the MMF Nufern with respect to tilt offset at input (mm). The solid line in FIG. 7A, FIG. 7B and FIG. 7C represents the set of plano-convex lenses 24 having radii of curvature of 13.91. The dashed line in FIG. 7A, FIG. 7B and FIG. 7C represents the set of plano-convex lenses 24 having radii of curvature of 12.27. As shown in the graphs of FIG. 6A-FIG. 7C, the difference in misalignment sensitivity at the first fiber optic cable 16 compared to the misalignment sensitivity at the second fiber optic cable 18 between the two sets of radii of curvature is not significant.

In operation, and with reference to FIG. 1 and FIG. 2., the light beam 36 is emitted from the first fiber optic cable 16 out of the tip 54 of the input fiber optic connector 12 into a free space 103 towards the generally planar surface 58 of the plano-convex lens 24 along a free space optical path 104 which is along an optical axis X3. In one example, the optical axis X3 is the same as the longitudinal axis X1, however, the optical axis X3 is an imaginary line that defines the path along which the light beam 36 propagates through the FORJ 10 from the first end 40 to the second end 42, and, therefore, the optical axis X3 may be different dependent on the particular configuration of the FORJ 10. In other words, the optical axis of each respective end 40, 42 is aligned with the free space optical path 104 of the light beam 36.

Figure 8:
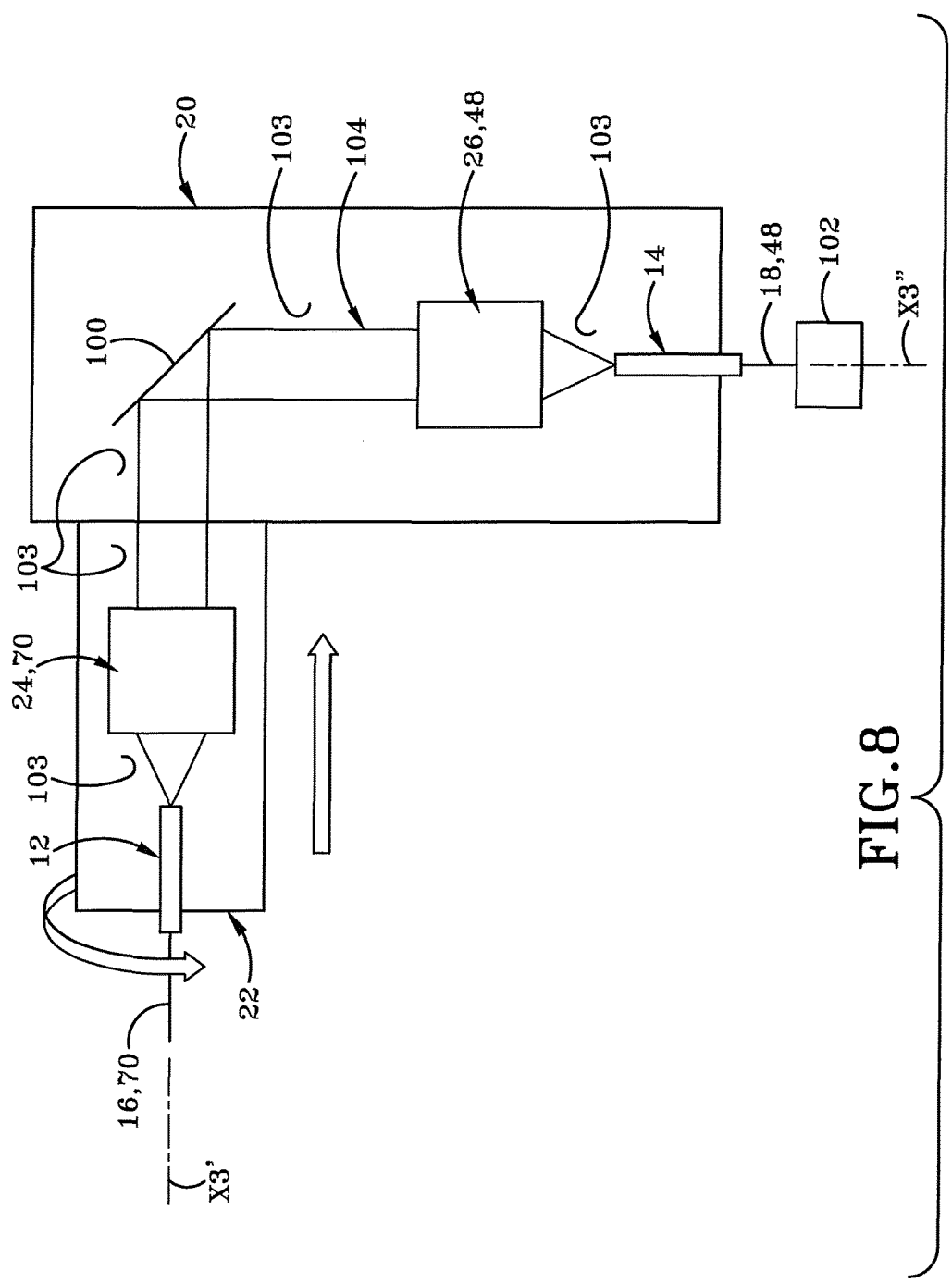
FIG. 8 (FIG. 8) is a schematic representation of an embodiment of the fiber optic rotary joint including a deflecting mechanism.

For example, and as shown in FIG. 8, in the event a deflecting mechanism 100 is disposed between the optical path of the light beam 36, then the first end 40 of the FORJ 10 will not be in axial alignment with the second end 42 of the FORJ 10. In this case, the light beam 36 travels from the first end 40 along a first optical axis X3' until it contacts the deflecting mechanism 100. After the light beam 36 contacts the deflecting mechanism 100 the light beam 36 travels in a different direction towards the second end 42 of the FORJ 10 along a second optical axis X3". The FORJ 10 may be configured in any suitable manner to accommodate any suitable optical axis of the light beam 36. In one example, the deflecting mechanism 100 may be a mirror, however, any suitable deflecting mechanism 100 may be utilized.

The light beam 36 is conditioned by the plano-convex lens 24 and directed along the optical axis X3 towards the rotor 22 which is rotating about the axis of rotation X1 relative to the stator 20. In one example, the axis of rotation X1 is parallel and collinear with the optical axis X3. In another example, and in the event the FORJ includes more than one optical axis X3, then the axis of rotation X1 is parallel and collinear with at least one optical axis of the FORJ 10.

The light beam 36 may be conditioned by any suitable beam conditioning optics module 80. In one example, the light beam 36 is conditioned by a beam conditioning optics module 80 that is free of power-limiting optics which may include, but are not limited to microlenses, gradient Index (GRIN) lenses and ball lenses. In another example, the conditioned light beam 36 passes from the first beam conditioning mechanism 24 to the second beam conditioning mechanism 26 uninterrupted and free of light-refracting elements.

In one embodiment according to the present disclosure, the ratio of a diameter of the light beam 36 emitted from the first fiber optic cable 16 to a diameter of the conditioned light beam 36 is approximately 1:100, however, other suitable expansion ratios may also be utilized. This high ratio of light beam 36 expansion between the first fiber optic cable 16 and the second fiber optic cable 18 of the FORJ 10 significantly decreases rotational sensitivity and increases damage threshold associated with the FORJ 10.

The plane of rotation P1 of the rotor 22 is positioned within a conditioned portion 76 of the light beam 36. In other words, the rotation of the rotor 22 occurs in the conditioned portion 76 of the light beam 36 as shown in FIG. 2. The rotor 22 may be rotated at any suitable speed.

Positioning the plane of rotation P1 within the conditioned portion 76 of the light beam 36 is beneficial because it allows the FORJ 10 to be constructed to meet the necessary mechanical alignment and positional tolerances required by the FORJ 10 (e.g., inter alia, aligning the stator 20, the input fiber optic connector 12, the first fiber optic cable 16, the first beam conditioning mechanism 24, the second beam conditioning mechanism 26, the output fiber optic connector 16, the second fiber optic cable 18, and the rotor 22.)

In one aspect according to the present disclosure, the conditioned light beam 36 is directed along the optical axis X3 and enters into the plano-convex lens 26. The plano-convex lens 26 focuses the light beam 36 into the tip 66 of the output fiber optic connector 14 and into the second fiber optic cable 18. The conditioned light beam 36 is then routed to a desired component for a specific application which may include, inter alia, a gimbal/turret associated with Light Detection & Ranging (LADAR), Directional Infrared Countermeasures (DIRCM), Infrared Search & Track (IRST), laser range finding and active laser designation. In one example, the FORJ 10 is carried by a multi-axis pointing gimbal 102.

With reference to FIG. 3A and FIG. 3B, the FORJ 10 operates in a similar manner; however, the input fiber optic connector 12 is operably coupled to first fiber optic cable 16, the first beam conditioning mechanism 24 and the rotor 22. In other words, the first fiber optic cable 16 is operably coupled to the rotor 22 instead of the stator 20 as depicted in FIG. 2. Therefore, the FORJ 10 may be configured in any suitable configuration dependent upon, inter alia, required design specifications.

An exemplary method may be better appreciated with reference to a flow diagram. While for purposes of simplicity of explanation, the illustrated methodology is shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 9:
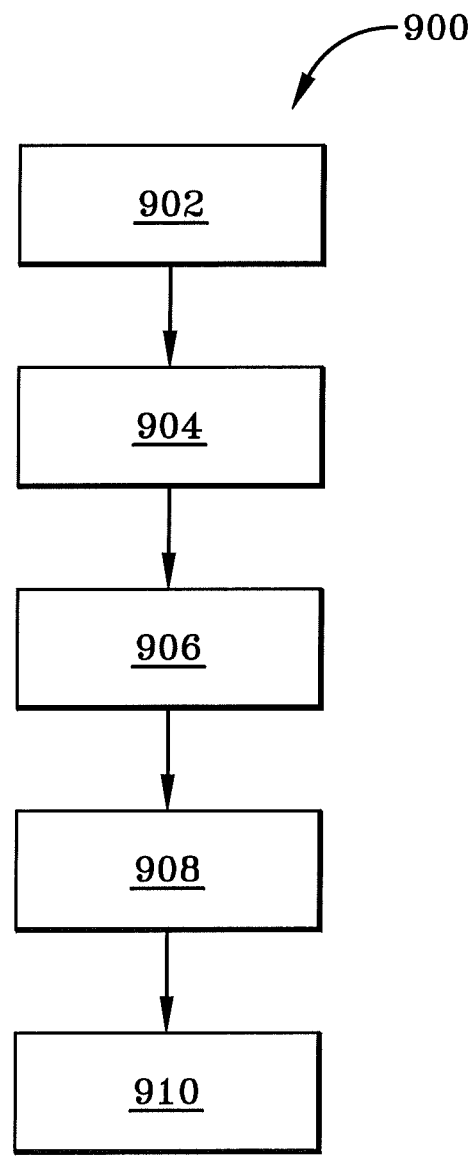
FIG. 9 (FIG. 9) a flowchart depicting an exemplary method for transmitting high power light beams over a rotary interface.

In accordance with one aspect of the present disclosure, FIG. 9 depicts a flowchart of a method 900 for transmitting high power light beams with high coupling efficiency. The method 900 first transmits the light beam 36 from the first fiber optic cable 16 into a free space 103, which is shown generally at 902. The method 900 conditions the transmitted light beam 36 with the first beam conditioning mechanism 24, which is shown generally at 904. The method 900 directs the conditioned light beam 36 along the axis of rotation X1 that is parallel and collinear with an optical axis X3 towards the second beam conditioning mechanism 26, which is operably coupled with the rotor 22, shown generally at 906.

The method 900 rotates the rotor 22 about the axis of rotation X1 in the plane P1 positioned within the portion of the conditioned light beam 76, which is shown generally at 908. The method 900 focuses the conditioned light beam 36 with the second beam conditioning mechanism 26 into the second fiber optic cable 18, which is shown generally at 910. The method 900 may be utilized to transmit the light beam 36 across the plane of rotation P1 from a single-mode fiber optic cable to a multi-mode fiber optic cable. The method 900 may also be utilized to transmit the light beam 36 across the plane of rotation P1 from a single-mode fiber optic cable to a single-mode fiber optic cable.

The method 900 may further include transmitting the optical power from the first fiber optic cable 16 to the second fiber optic cable 18 at an average power of at least 5 watts. The method 900 may further include transmitting the optical power from the first fiber optic cable 16 to the second fiber optic cable 18 with an at least 90 percent coupling efficiency. The method 900 may further include that the light beam 36 passes from the first fiber optic cable 16 to the second fiber optic cable 18 free of passing through a power-limiting optic. The method 900 may further include deflecting the conditioned light beam 36 within a conditioned portion 76 of the light beam 36. The method may further include operatively coupling the FORJ 10 with the multi-axis pointing gimbal 102.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A fiber optic rotary joint comprising:
    a first fiber optic cable operably coupled to one of a stator and a rotor having a first end;
    a second fiber optic cable operably coupled to the other of the stator and the rotor, the stator and the rotor defining a free space between the first fiber optic cable and the second fiber optic cable and the rotor rotatable about an axis of rotation parallel and collinear with an optical axis of at least one end of the fiber optic rotary joint;
    a first beam conditioning mechanism including a first lens configured to condition a light beam emitted from the first fiber optic cable; and
    a second beam conditioning mechanism including a second lens configured to focus the conditioned light beam into the second fiber optic cable; wherein a ratio of a diameter of the light beam being emitted from the first fiber optic cable to a diameter of the conditioned light beam is at least approximately 1:100; and wherein all light entering the fiber optic rotary joint passes through the first lens of the first beam conditioning mechanism and the second lens of the second beam conditioning mechanism; and wherein the first end of the rotor is disposed radially adjacent the free space between the first lens and the second lens.

2. The fiber optic rotary joint of claim 1, wherein a plane of rotation of the rotor is positioned within a conditioned portion of the light beam in the free space.

3. The fiber optic rotary joint of claim 1, wherein the conditioned light beam passes from the first beam conditioning mechanism to the second beam conditioning mechanism uninterrupted and free of light-refracting elements.

4. The fiber optic rotary joint of claim 1, wherein the light beam passes from the first fiber optic cable to the second fiber optic cable free of passing through a power-limiting optic.

5. The fiber optic rotary joint of claim 1, wherein the first beam conditioning mechanism and the second beam conditioning mechanism are achromatic.

6. The fiber optic rotary joint of claim 1, wherein at least one of the first beam conditioning mechanism and the second beam conditioning mechanism are in an asymmetrical configuration.

7. The fiber optic rotary joint of claim 1, wherein at least one of the first beam conditioning mechanism and the second beam conditioning mechanism comprise a polarization sensitive optic.

8. The fiber optic rotary joint of claim 1, wherein at least one of the first beam conditioning mechanism and the second beam conditioning mechanism comprise a spectral filter.

9. The fiber optic rotary joint of claim 1, wherein the first fiber optic cable is a single-mode fiber optic cable.

10. The fiber optic rotary joint of claim 1, further comprising:
a multi-axis pointing gimbal, wherein the fiber optic rotary joint is carried by the multi-axis pointing gimbal.

11. The fiber optic rotary joint of claim 1, further comprising:
a deflecting mechanism, wherein the conditioned light beam contacts the deflecting mechanism within the conditioned portion of the light beam.

12. The fiber optic rotary joint of claim 1, further comprising:
at least one retaining ring disposed radially adjacent the free space between the first lens and the second lens.

13. The fiber optic rotary joint of claim 1, further comprising:
at least one wave spring disposed radially adjacent the free space between the first lens and the second lens.

14. A method for transmitting optical power through a rotary interface, the method comprising:
emitting a light beam from a first fiber optic cable operably coupled with one of a stator or a rotor having a first end into a free space;
conditioning the emitted light beam with a first beam conditioning mechanism including at least one optic;
directing the conditioned light beam along an axis of rotation that is parallel and collinear with an optical axis of at least one end of the fiber optic rotary joint towards a second fiber optic cable operably coupled to the other of the stator or the rotor;
rotating the rotor about the axis of rotation; and
focusing the conditioned light beam with a second beam conditioning mechanism including at least one optic into the second fiber optic cable; wherein a ratio of a diameter of the light beam being emitted from the first fiber optic cable to a diameter of the conditioned light beam is at least approximately 1:100; and wherein all light entering the fiber optic rotary joint passes through at least one respective optics of the first beam conditioning mechanism and the second beam conditioning mechanism; and wherein the first end of the rotor is disposed radially adjacent the free space between the first lens and the second lens.

15. The method of claim 14, wherein the rotation of the rotor about the axis of rotation occurs in a plane positioned within a portion of the conditioned light beam in the free space.

16. The method of claim 14, the light beam passes from the first fiber optic cable to the second fiber optic cable free of passing through a power-limiting optic.

17. The method of claim 14, further comprising:
deflecting the conditioned light beam within a conditioned portion of the light beam.

18. The method of claim 14, further comprising:
operatively coupling the fiber optic rotary joint with a multi-axis pointing gimbal.

19. The method of claim 14, further comprising:
positioning at least one retaining ring radially adjacent the free space between the first lens and the second lens.

20. The method of claim 14, further comprising:
positioning at least one wave spring radially adjacent the free space between the first lens and the second lens.

* * * * *